United States Patent
Jarzewiak

[11] Patent Number: 5,833,465
[45] Date of Patent: Nov. 10, 1998

[54] ALPHA-BLOX

[76] Inventor: Michael George Jarzewiak, 2272 Halyard Ct., St. Louis, Mo. 63219-4323

[21] Appl. No.: 956,399

[22] Filed: Oct. 23, 1997

[51] Int. Cl.$^6$ ..................................... G09B 1/36
[52] U.S. Cl. ........................... 434/171; 446/125
[58] Field of Search ................... 434/208, 171, 434/172; 446/125, 129

[56] References Cited

U.S. PATENT DOCUMENTS

| D. 163,085 | 5/1951 | Bishop | 434/208 |
|---|---|---|---|
| 176,144 | 4/1876 | McDougall | 434/125 |
| 1,412,204 | 4/1922 | Derby | 434/172 |
| 3,374,917 | 3/1968 | Troy | 446/125 |
| 3,604,145 | 9/1971 | Zimmerman | 446/125 |
| 4,212,118 | 7/1980 | Baldwin et al. | 434/208 |
| 4,419,081 | 12/1983 | Steinmann | 434/208 |
| 4,802,854 | 2/1989 | Davis | 434/159 |
| 4,966,366 | 10/1990 | Mercado-Torres | 434/172 |
| 5,057,049 | 10/1991 | Kaczperski | 446/128 |
| 5,306,198 | 4/1994 | Forman | 446/120 |
| 5,554,062 | 9/1996 | Goldsen | 446/124 |

FOREIGN PATENT DOCUMENTS

| 1174184 | 3/1959 | France | 434/172 |
|---|---|---|---|
| 9008 | of 1889 | United Kingdom | 446/125 |
| 1269755 | 4/1972 | United Kingdom | 446/125 |

*Primary Examiner*—Paul J. Hirsch
*Attorney, Agent, or Firm*—Patent & Trademark Services; Thomas Zack; Joseph H. McGlynn

[57] ABSTRACT

An educational interlocking block set having six facing sides. Two of the opposite block sides have either a four spaced projecting male protrusions or a four spaced complimentarily shaped receiving female recesses for male protrusions of an adjoining interconnected block. The other four sides of each block may have the same letter thereon to permit the viewing of their displayed surfaces. When several interlocked blocks are viewed, either in horizontal or vertical configurations, words may be spelled out by the displayed letters of the blocks. Vertically aligned blocks may be either stacked upon joined lower horizontally disposed blocks or may be joined vertically thereto. An almost endless configuration of joined blocks representing different joined shapes, such as pyramids and diamonds, may be constructed with visible surface letters.

2 Claims, 3 Drawing Sheets

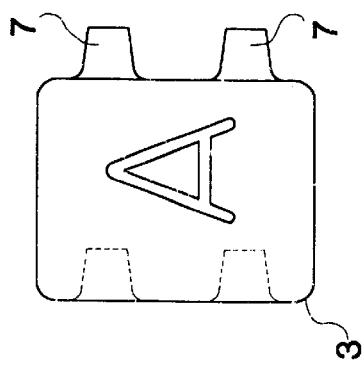
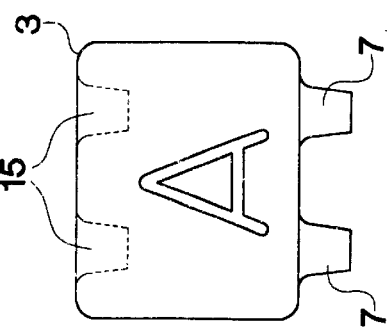
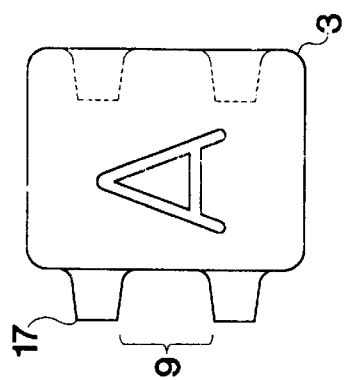
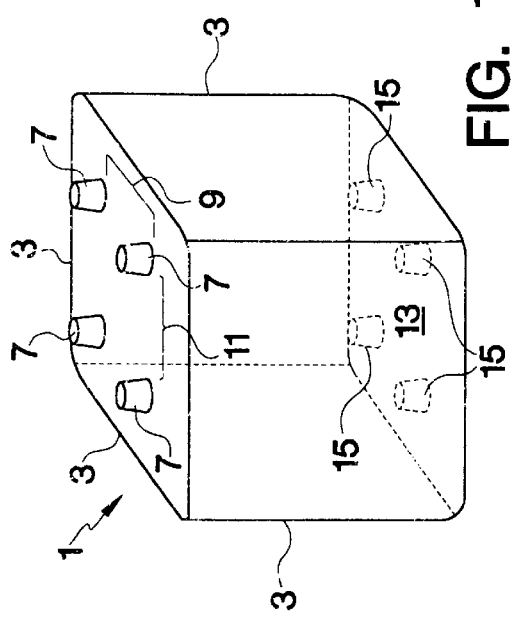
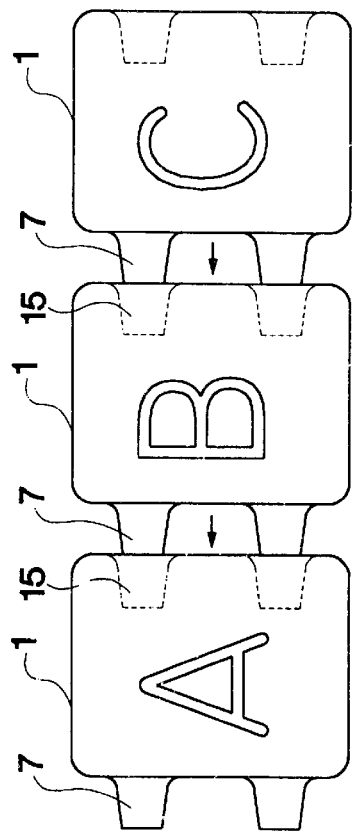

ALPHA-BLOX

BACKGROUND OF THE INVENTION

Letters of the alphabet (A to Z for our purposes) have been used to educate and amuse. This is especially pertinent to early age children such as those in day care, preschool and kindergarten up to ages 6 or 7 years old. With some such letters, Individual blocks each embodying a specific letter of the alphabet have been formed that may be positioned to stand in a upright or vertical disposition with respect to a lower holding base. Protrusions or male members in the lower portions of the letters base mate with indentations in the holding base for this purpose.

In some block games interconnecting blocks having mating male posts and female apertures have been disclosed. Some interconnecting block game members with interconnecting plugs may have indicia on covering replaceable end plates indicating various covering themes including letters of the alphabet.

In a recent invention building blocks with alphabetical indicia are joined together by protruding peg on one block face that may engage any of five recesses on another block's five faces. A peg in the back of a plate with a letter on its front side may be inserted into the block's recess.

The present invention also relates to interconnecting blocks having six facing sides. Two opposite sides of each block have either four protruding spaced male nodule inserts or four complimentarily shaped female inserts to permit the joining of mating blocks so formed. Letters may be placed on all four of the blocks facing sides that do not have either male inserts or female inserts on their sides thereby permitting the formation of various interlocking block formations which can provide an educational experience to the user as explained in detail hereafter.

DESCRIPTION OF THE PRIOR ART

Interconnecting letters or blocks with indicia representing letters of the alphabet or numbers, etc. are known in the art. For example, in U.S. Pat. No. 4,802,854 to Davis individual letters of the alphabet and individual numbers are supported on a lower holding base by using lower extensions that are inserted into a supporting track groove in the base.

With some interconnecting blocks sets, such as U.S. Pat. No. 5,057,049 to Kaczperski, the equidistant spacing among adjacent post members on the block's face is provided to insertion of one or more posts into a recess or recesses of another joining block.

In U.S. Pat. No. 5,306,198 to Forman the interconnecting block assembly has blocks with recesses into which resilient plugs fit to join them together while replaceable panel plates with facial letters or other indicia may also be inserted into the block's recesses for display.

In U.S. Pat. No. 5,554,062 to Goldsen letter units are selectively secured to the faces of recessed interlocking blocks by using mating projecting pegs which fit into the recesses. The present invention differs from this cited and the known prior art by providing for a six sided block set having two opposite sides with either four protruding male nodule inserts or four female recessed insets while the other four block sides have letter or other indicia thereon all as more further set forth in this specification.

SUMMARY OF THE INVENTION

This invention relates to an education interconnecting block having six facing sides. Two of the opposite sides have either a plurality of projecting male protrusions or a plurality of complimentarily shaped receiving female recesses for the male protrusions. The other four sides of the blocks may have indicia thereon, such as letters of the alphabet, to permit viewing of their surfaces when the blocks are connecting in various configurations.

It is the primary object of the present invention to provide for an improved educational toy using interconnecting blocks.

Another object is to provide for such a toy wherein the blocks have six sides two of which have a plurality of spaced protrusions or a plurality of spaced protrusion receiving recesses while the block's other four sides may have indicia, such as letters of the alphabet, thereon.

These and other objects and advantages of the present invention will become apparent to readers from a consideration of the ensuing description and the accompanying drawings.

BRIEF DESCRIPTION OF THE DRAWINGS

FIG. 1 is a perspective view of one of the block of the invention's preferred embodiment.

FIGS. 2(a)–(d) are different side views of the FIG. 1 block showing the same letter on each of four different block sides.

FIG. 3 shows a side view of three different block being joined together with each block having a different displayed letter on its facing side.

DESCRIPTION OF THE PREFERRED EMBODIMENT

Figure 4:
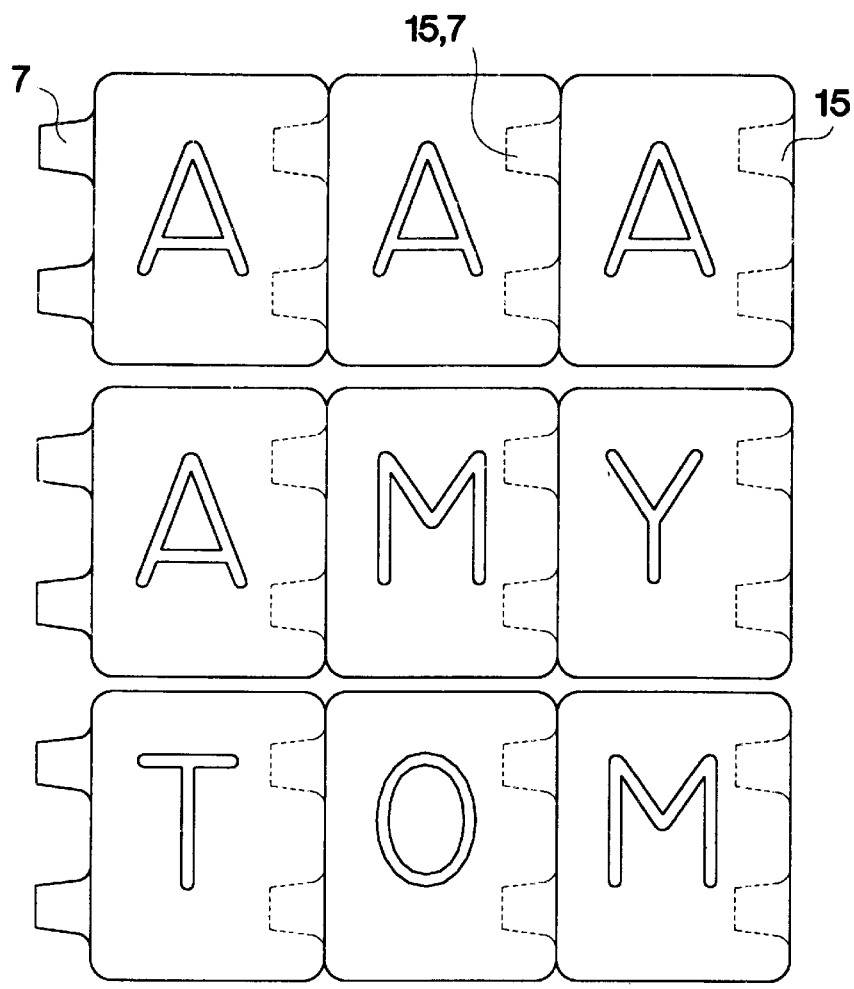
FIG. 4 shows a side view of nine different blocks joined together horizontally and stacked vertically with various letters on their individual facing sides used to spell words.

FIG. 1 is a perspective view of one of the block of the invention's preferred embodiment. The block 1 is formed as a cube with six generally flat facing sides formed by three sets of opposite facing sides with two sides in each set. All joining exterior side and corner cube edges 3 are rounded to present a safe not sharp surface to a user. One of the facing sides 5 is generally flat except for four identical outwardly protruding spaced male tapered protrusions or frusto conical shaped protrusions 7. The protrusion's diameter tapers inwardly or decreases as the height of the protrusion increases from its supporting facing surface side 5.

These male protrusions are located near each of the supporting side's four corners with the spacing 9 between two of the four protrusions being equal. The distance or spacing 11 between two adjacent protrusions, measured perpendicular to the spacing 9, is also equal but not necessarily the same as the spacing distance 9.

On the opposite or bottom side downwardly facing cube side 13 the supporting surface is generally flat except for four identical spaced female inwardly tapered recesses 15, shown in dotted line format, protruding into the cube's interior. Each tapered recessed is spaced apart the same distance as the top surface's tapered protrusions with a slightly greater diameter than the corresponding largest diameter of the male protrusions as measured from the cube's corresponding adjoining flat supporting surface (i.e. either surface 5 of surface 13). Thus, the identical recesses are configured and spaced on their surface planes to act as tapered receiving members for the tapered protrusions of another identical cube to permit the cubes to be interlock and join together in a protrusion/recess relationship.

FIGS. 2(*a*)–(*d*) are different side views of the FIG. 1 block 1 showing the same letter on each of four different block sides. These shown four sides represent the cube's sides that do not have either the spaced protrusions 7 or the spaced recesses 15 associated with their respective facing surface. The same letter A shown erect on each facing side whether the protrusions 7 face to the left (FIG. 2 (*a*)), to the right (FIG. 2 (*b*)), up (FIG. 2 (*c*)) or downwardly (FIG. 2 (*d*)).

As previously stated, the recesses 15, indicated by dotted lines, for each cube or block are on the opposite face side from those having the protrusions. Since this is a side view only two of the four protrusions and recesses are visible in this view. The free ends 17 of the protrusions are slightly tapered to a smaller size than where the protrusion joins to the facing cube side. For example, in one embodiment the end 17 was ⅜ of an inch across while the protrusion's base was 7/16 of an inch across or a difference of 1/16 of an inch and the protrusion was ⅜ of an inch long. The recesses in this embodiment had a uniform depth and cross sectional diameter of ½ of an inch. The square cube was 2.5 inches across as measured across the sides having the protrusions/recesses by a perpendicular height measurement of two inches.

FIG. 3 shows a side view of three different block being joined together serially with each block 1 having a different displayed letter on its facing side. Starting to the left, the first block has the letter A displayed thereon while the next block has the letter B while the right most block has the letter C thereon. Clearly, any letters of the alphabet or any other written language could be displayed on each of the facing block sides.

The two arrows shown indicate the direction the middle and right blocks are being pushed to join their respective protrusions 7 into the receiving recesses 15 of the adjacent block to which it is about to be interlocked with. Any colors may be used for each of the blocks and the letters displayed may be either imprinted upon or raised from their side surfaces.

FIG. 4 shows a side view of nine different blocks (3 sets of 3 blocks each) joined together both horizontally with various letters on their individual facing sides used to spell words. For example, the top three joined block spell out CAT while the intermediate three joined blocks spell out AMY with the lowest set spelling out the name TOM. Each set is stacked upon the lower set except for the lowest set. The male protrusions 7 are fully inserted into the adjoining female recesses 15 of the adjacent block as shown by the dotted lines. By using any number of blocks words may be formed either horizontally, vertically or across diagonally to educate the young user.

Figure 5:
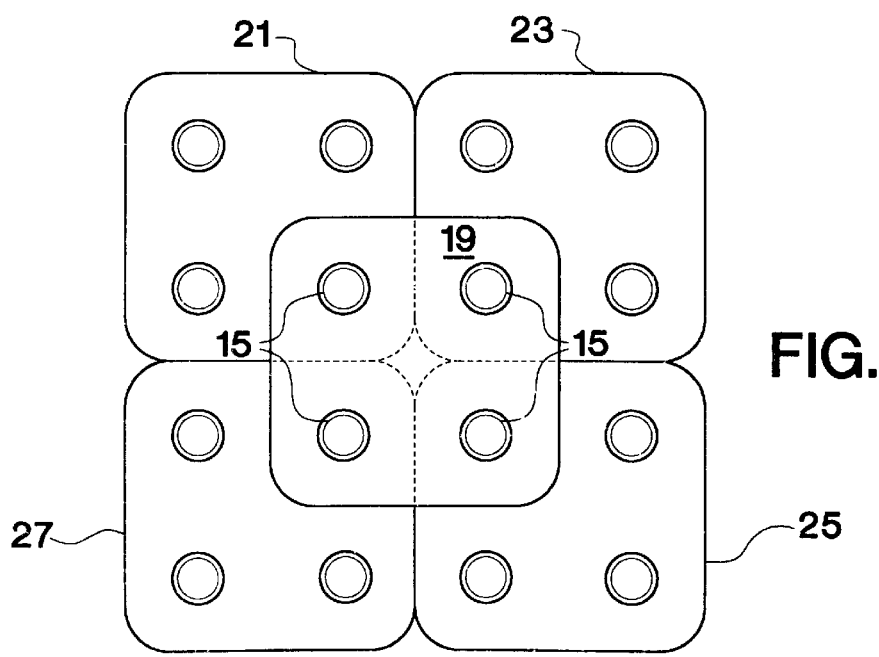
FIG. 5 shows a top view of five blocks all joined together with one block being joined to a single recess in each of four different lower joined blocks.

FIG. 5 shows a top view of five blocks all joined together with one block being joined to a single recess in each of four different lower joined blocks. The top block 19 has four shown spaced recesses with four spaced protrusions each of which protrusion fits into a corner recess of each of the four joined lower identical blocks designed in this figure as 21, 23, 25, and 27. All five blocks shown as configured as is block 1 of FIG. 1. With the configuration of this figure the blocks are shown as being joined both horizontally and vertically together by properly placing their respective protrusions into receiving recesses in mating adjoining blocks.

Figure 6:
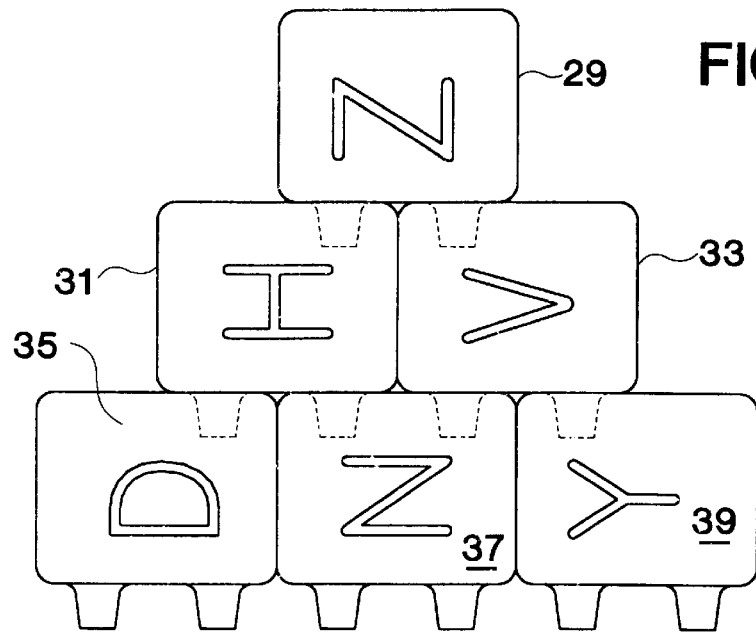
FIG. 6 shows a side view of six blocks all joined together to form a pyramid of joined blocks.

FIG. 6 shows a side view of six identical blocks all joined together to form a pyramid of joined blocks. The top block 29 has four upper spaced recesses with four lower spaced protrusions. Each protrusion fits into a corner recess of one of the two joined lower identical blocks designed in this figure as 31 and 33 with two protrusions of block 29 in each block. In turn the lower protrusions of blocks 31 and 33 fit into upper recesses in the three blocks designated as blocks 35, 37 and 39. All six blocks shown are each configured as is block 1 of FIG. 1.

Figure 7:
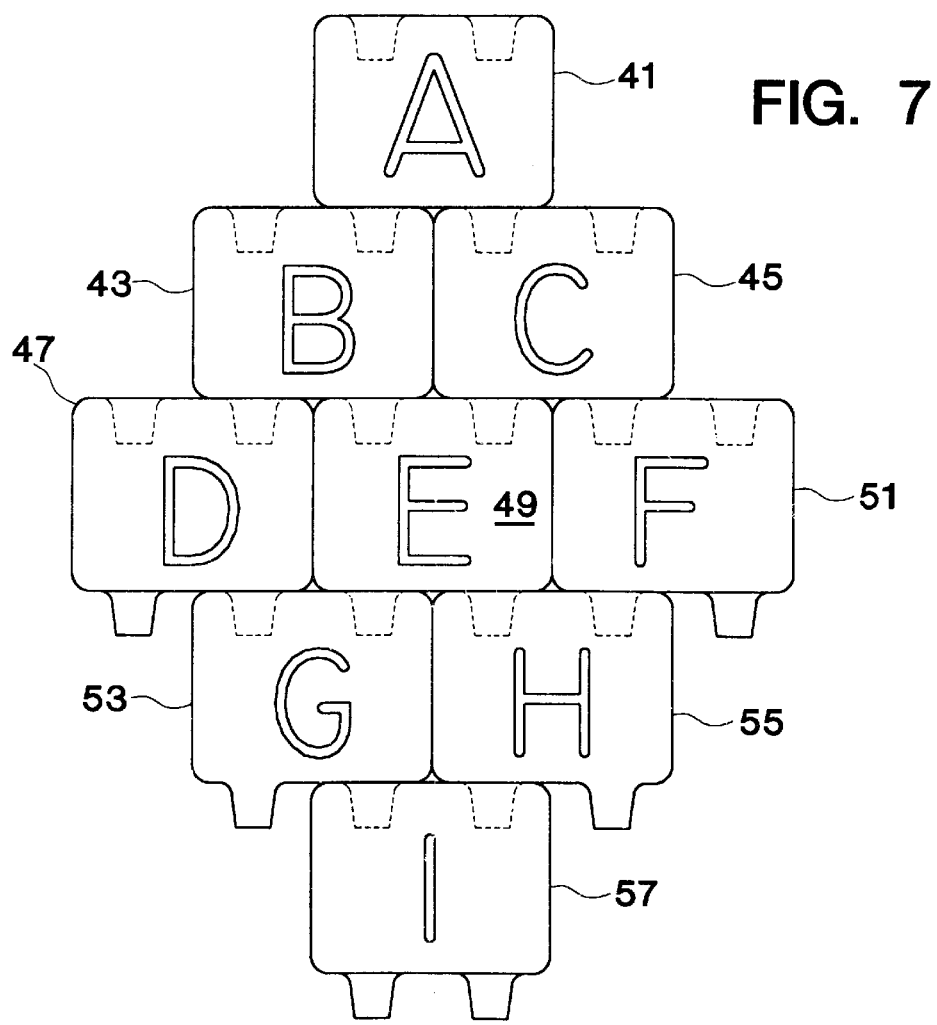
FIG. 7 shows a side view of nine blocks all joined together to form a diamond shape of joined blocks.

FIG. 7 shows a side view of nine blocks all joined together to form a diamond shape of joined blocks. Starting from the top these identical joined blocks are designated by the numbers 41,43,45,47,49,51,53,55 and 57, as shown. All nine blocks are each configured as is block 1 of FIG. 1 with tapered protrusions and tapered recesses. Clearly the almost an endless number of other joined block configurations are clearly possible such as placing two protrusions of an upper block into two recesses of two lower joined blocks to formed joined vertical and horizontal block sets and different visual word displays.

The blocks may be made of a durable nontoxic plastic material, such as a PVC (polyvinyl chloride) as long as the material is safe for young persons to use. The dimensions of the blocks may vary as well as the dimensions of the protrusions, recesses and other illustrated features. Numbers could also be used in place of, or in combination with, the block letters illustrated to assist in the learning process.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An educational interconnecting block set comprising:

a plurality of interconnectable blocks, each of said blocks having six facing side surfaces, one of said side surfaces having four spaced projecting frusto-conical shaped male protrusions whose diameter deceases as the protrusion distance increases from the supporting facing block side surface, four complimentarily shaped and spaced female recesses on the opposite side surface of the block side surface with said protrusions, said female recesses each being capable of receiving a male protrusion from a different adjoining block with four similarly shaped and spaced frusto-conical shaped protrusions; and each of said blocks having letter indicia on each of the four facing block side surfaces without said four frusto-conical spaced protrusions or said four female recesses.

2. The educational interconnecting block set of claim 1 wherein said letter indicia on each of said four facing block sides is the same letter on each side.

\* \* \* \* \*

UNITED STATES PATENT AND TRADEMARK OFFICE
CERTIFICATE OF CORRECTION

PATENT NO. : 5,833,465
DATED : November 10, 1998
INVENTOR(S) : Michael George Jarzewiak It is certified that error appears in the above-identified patent and that said Letters Patent is hereby corrected as shown below:

On the title page, item [76], change the inventors zip code to -- 63129-4323 --.

Signed and Sealed this

Fourth Day of May, 1999

Attest:

Q. TODD DICKINSON

Attesting Officer

Acting Commissioner of Patents and Trademarks